United States Patent [19]

O'Connor

[11] Patent Number: 5,894,571
[45] Date of Patent: Apr. 13, 1999

[54] PROCESS FOR CONFIGURING SOFTWARE IN A BUILD-TO-ORDER COMPUTER SYSTEM

[75] Inventor: Clint H. O'Connor, Austin, Tex.

[73] Assignee: Dell U.S.A., L.P., Round Rock, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/514,649

[22] Filed: Aug. 14, 1995

[51] Int. Cl.$^6$ ..................................................... G06F 9/445
[52] U.S. Cl. ..................................................... 395/652
[58] Field of Search .................................. 395/652, 651, 395/712

[56] References Cited

U.S. PATENT DOCUMENTS

| | | | |
|---|---|---|---|
| 5,113,518 | 5/1992 | Durst, Jr. et al. | 395/186 |
| 5,230,052 | 7/1993 | Dayan et al. | 395/652 |
| 5,325,532 | 6/1994 | Crosswy et al. | 395/652 |
| 5,371,792 | 12/1994 | Asai et al. | 380/3 |
| 5,418,918 | 5/1995 | Vander Kamp et al. | 395/652 |
| 5,459,867 | 10/1995 | Adams et al. | 395/681 |
| 5,504,904 | 4/1996 | Dayan et al. | 395/651 |

*Primary Examiner*—James P. Trammell
*Assistant Examiner*—John Q. Chavis

[57] ABSTRACT

A process for manufacturing a computer system, including a selected hardware configuration and a selected software configuration, utilizes a CD-ROM writer connected to a manufacturing system network to select and write a custom software configuration to a CD-ROM. The CD-ROM is used to install the selected software configuration onto a custom hardware configuration and to subsequently serve as a permanent backup copy of the software configuration. The CD-ROM is written with an identifier of the specific computer hardware assembled in the manufacturing process and the identification written to the CD-ROM is checked when the software is loaded from the CD-ROM onto the computer so that the software is only accessible to the specified computer hardware.

7 Claims, 2 Drawing Sheets

PROCESS FOR CONFIGURING SOFTWARE IN A BUILD-TO-ORDER COMPUTER SYSTEM

FIELD OF INVENTION

This invention relates to the field of computer system manufacturing processes. More specifically, this invention relates to a process for configuring and restricting a computer system software to a specific computer hardware.

BACKGROUND OF THE INVENTION

In the past, personal computer systems have generally been sold with no software, or only a limited amount of software, installed. Thus, a customer of the system had generally been required to install and configure the software of a system. Similarly, computer customers often were required to combine and configure the hardware in a computer system. However, computer systems are no longer sold as hardware boxes having software to be added by the customer or simply shipped with software, making software installation a responsibility of the user. More recently, computer systems have become available in a large number of configurations. Furthermore, it has become possible to custom-order a computer system having a particular hardware configuration. Also, computer manufacturers now provide turn-key computer systems that are immediately operable. However, a wide variety of software operating systems, drivers, application programs and the like are available so that a computer customer often must invest a substantial amount of time to configure the software in a computer system in a desired manner.

Computer manufacturers continually accelerate the rate of computer system production. While many more computer systems are built, expectations of customers are rising regarding the facility of immediately using a computer system without a time expenditure to configure the system in a desired manner. Computer manufacturers now offer hardware accessories and software in a combined system at the time of purchase.

An increasingly complex combination of internally-manufactured computer hardware and manufacturer-loaded software, which is furnished by external software venders, is creating substantial difficulty for computer manufacturers in the areas of customer support and warranty support. In particular, a common strategy of manufacturers is to preload hard disk drives of computer systems with common operating systems, for example DOS and Windows. In some cases, manufacturers incur the additional expense of shipping backup floppy disks for these operating systems, in combination with other software packages, to the customer. In other cases, manufacturers transfer to the customer the burden of writing from the hard drive to backup floppy disks. Customers find this task quite burdensome due to the very long time required to transfer backup copies to the floppy disks. If a customer fails to generate the backup floppy disks and the software on the hard drive is corrupted, a manufacturer must provide costly technical support services. Costs incurred in furnishing these services often cannot be recovered by the manufacturer. In addition, a customer who must rely on these technical services is commonly unable to use the computer for some amount of time so that anger and dissatisfaction of the customer result.

One method for preloading customer software is performed by extracting a hard drive from the computer assembly process, connecting the hard drive to a computer for the purpose of programming the drive, programming the drive, disconnecting the drive from the computer and returning the programmed hard drive to the computer assembly process for installation on a computer. This method is time consuming and, therefore, costly. Furthermore, disconnection and connection of the programmed hard drive often corrupts the software programmed onto the drive.

Another method for preloading customer software involves loading of the hard drive from a network after the computer hardware is assembled. This method results in high traffic on the network. In a large-volume manufacturing environment, this high traffic greatly reduces the throughput of the network. Furthermore, a network failure interrupts the entire manufacturing line.

What is needed is an improved process in which a manufacturer can tailor software to a particular customer's needs, in accordance with a customer order, load the tailored software onto a customer's hardware-specified system, and provide the customer with a capability to exactly restore the ordered software configuration without support from the manufacturer.

SUMMARY OF THE INVENTION

In accordance with the present invention, a process for manufacturing a computer system, including a selected hardware configuration and a selected software configuration, utilizes a CD-ROM writer connected to a manufacturing system network to select and write a custom software configuration to a CD-ROM. The CD-ROM is used to install the selected software configuration onto a custom hardware configuration and to subsequently serve as a permanent backup copy of the software configuration. The CD-ROM is written with an identifier of the specific computer hardware assembled in the manufacturing process and the identification written to the CD-ROM is checked when the software is loaded from the CD-ROM onto the computer so that the software is only accessible to the specified computer hardware.

In accordance with the present invention, a method of configuring software of a computer system includes the step of receiving a customer order for a computer system. The customer order includes a list of hardware configuration components and a list of software configuration components. The method further includes the steps of assembling hardware components designated by the list of hardware configuration components, recording software components designated by the list of software configuration components on a CD-ROM and loading software components from the CD-ROM onto the assembled hardware components.

In accordance with a first embodiment of the present invention, a method of configuring software of a computer system includes the steps of receiving a customer order for a computer system. The customer order includes a list of hardware configuration components and a list of software configuration components. The method further includes the steps of assembling hardware components designated by the list of hardware configuration components and recording software components designated by the list of software configuration components on a CD-ROM. Software components from the CD-ROM are loaded onto the assembled hardware components, thereby configuring the computer system.

In accordance with a second embodiment of the invention, a method of manufacturing a computer system includes the steps of placing an order for a computer system which designates selected hardware components and selected software components and generating a hardware list and a software list from the order. The hardware list is distributed to a hardware assembly line and the software list is distributed to a software assembly system. The method further includes the steps of assembling hardware components designated by the hardware list on the hardware assembly line and recording software components designated by the software list on a CD-ROM using the software assembly system. Software components from the CD-ROM are bootstrapped and loaded onto the assembled hardware components. The software-loaded and assembled hardware components are packaged with documentation and the CD-ROM and shipped to the customer.

In some embodiments, a method also includes the steps of assigning an identification number to the assembled hardware components and storing the identification number in the assembled hardware components. The identification number is also written to the CD-ROM. A CD-ROM bootstrap process is programmed to compare the identification number written to the CD-ROM with the identification number stored in the assembled hardware components and to complete the bootstrap operation only if the identification numbers match.

The disclosed process has several advantages over conventional computer system manufacturing processes. For example, the disclosed process allows a combination of software components to be tailored to a customer's requirements from a catalog of software utilities and applications which are known to be compatible with the computer system hardware requested by the customer. Furthermore, the software assembly sub-process is completely isolated from the hardware assembly sub-process so that the two sub-processes proceed in parallel, thereby reducing the time elapsed from customer order to customer shipping.

It is advantageous that the CD-ROM that is used to load software onto the assembled hardware components is also shipped to the customer. The customer thus receives a permanent backup copy of software that was originally loaded onto the system and appropriately licensed to the customer.

It is advantageous that usage of the CD-ROM discourages unauthorized copying of software which occurs in conventional systems when a customer orders software for a single computer hardware system and installs the software on multiple systems. In the disclosed manufacturing process, CD-ROMs are designated to be unique to a specific hardware system by writing an identification number of the hardware system to the CD-ROM. Some or all of the software files stored on the CD-ROM are encrypted so that the encrypted files can only be installed on the hardware system that the CD-ROM accompanies.

It is advantageous that the disclosed method reduces technical support and warranty costs of the manufacturer. The software configuration written to CD-ROM is a verified combination of software components that is known to be compatible with the assembled hardware components. If a problem arises in subsequent operation of the computer system, the original software configuration can be restored simply and efficiently from the CD-ROM.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION

Figure 1:
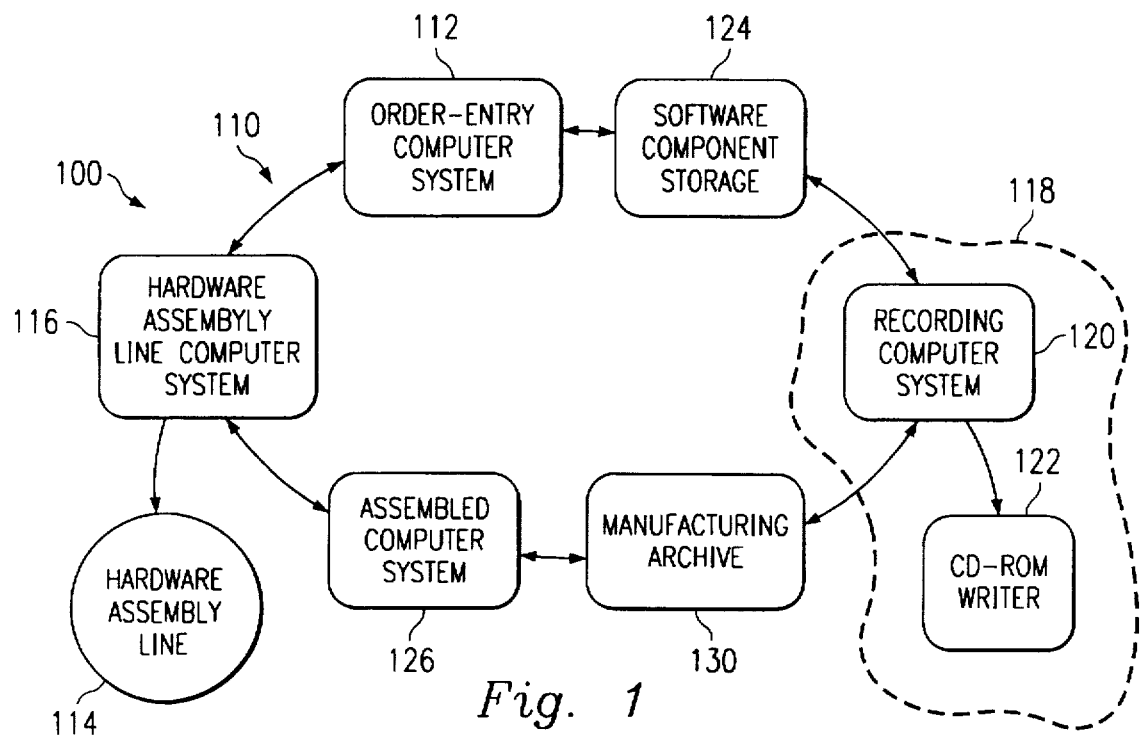
FIG. 1 is a schematic block diagram showing a network for communicating information among various systems in a computer system manufacturing environment.

Referring to FIG. 1, a schematic block diagram shows a network for communicating information among various systems in a computer system manufacturing environment. A manufacturing system 100 includes a network 110 which is connected to various computers, computer systems, workstations and storage devices. For example, an order-entry computer system 112 is furnished to receive and process orders for computer systems. System orders specify a desired hardware configuration and a desired software configuration. Network 110 communicates with a hardware assembly line 114 via a connection to a hardware assembly line computer system 116. Also the network 110 communicates with a software assembly system 118 via a connection to a recording computer system 120. The recording computer system 120 assembles system software and writes the assembled software on a CD-ROM using a CD-ROM writer 122. To assemble the software, the recording computer system 120 accesses a library of software program files that are furnished on a software component storage 124, which is connected to the network 110. At various stages in the manufacturing process, for example after the hardware system has been assembled and tested and after the hardware and software systems have been combined, the result of the manufacturing process—an assembled computer system 126—communicates over the network 110 to store and receive information such as log information, diagnostic test data and system configuration data. This information is typically stored in a manufacturing archive 130 which is also connected to the network 110.

Figure 2:
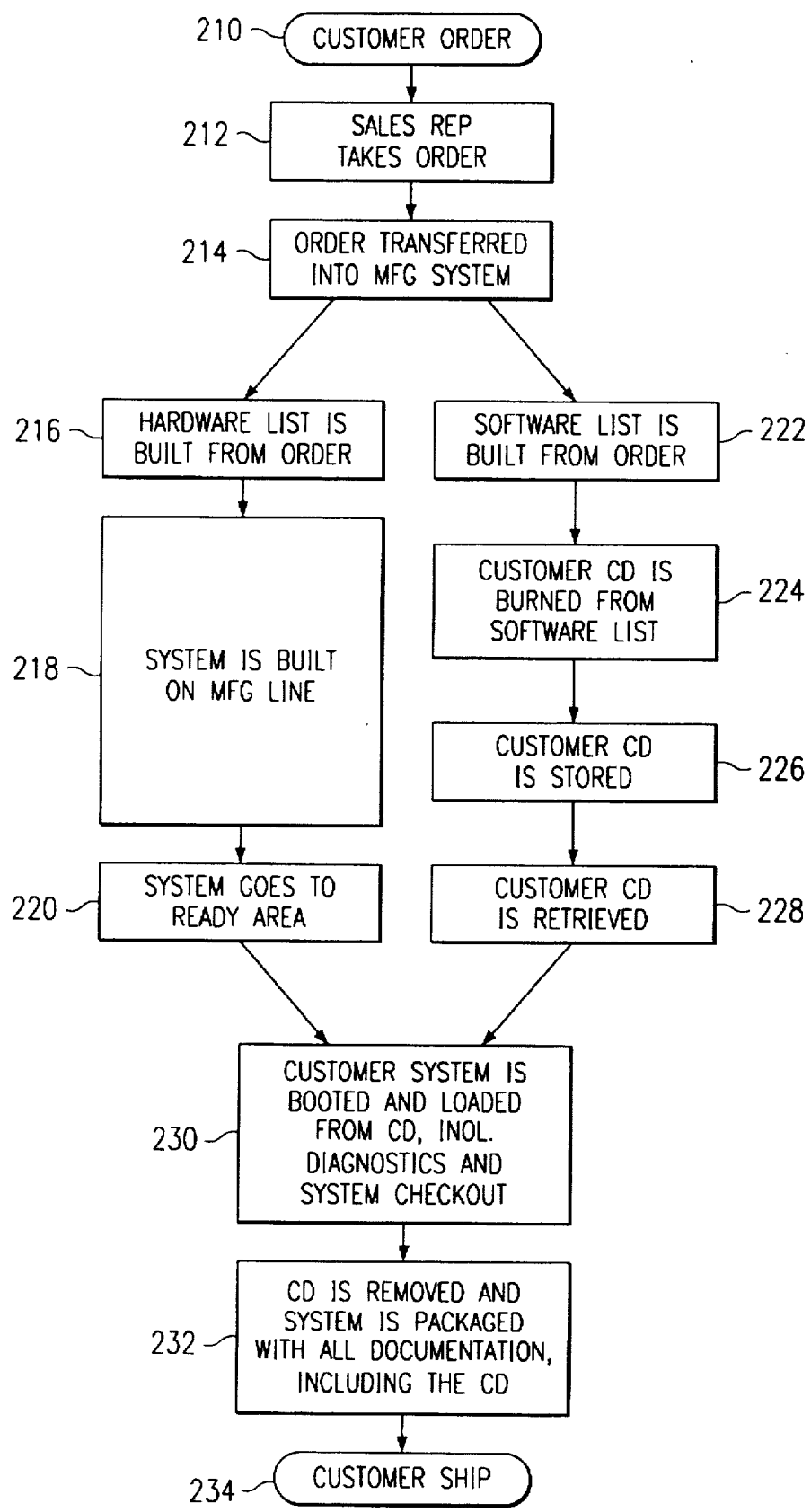
FIG. 2 is a flow chart which illustrates a method of manufacturing a computer system.

Referring to FIG. 2, a flow chart illustrates a method of manufacturing a computer system using the manufacturing system 100 shown in FIG. 1. A customer order is entered into the manufacturing system 100 in entry step 210. A sales representative takes the order in step 212 and places the order for a computer system designating hardware components and software components specified in the customer order. The order is placed on an order-entry computer system 112 which is connected to the network 110. The order-entry computer system 112 is used to generate a hardware list and a software list from the order. In some embodiments, the hardware list is checked to assure compatibility of the selected hardware components. The software list is checked for software component compatibility and to mutually configure the various software components for compatibility. Also, the software and hardware lists are verified to assure cross-compatibility of software and hardware configurations.

The order-entry computer system 112 accesses the network 110 to transfer the customer order into the manufacturing system 100 in step 224. The order-entry computer system 112 distributes the hardware list to the hardware assembly line 114 and, separately, distributes the software list to the software assembly system 118 so that hardware assembly and software assembly take place in parallel. In some embodiments of the manufacturing system 100, the hardware list is communicated to the hardware assembly line 114 over the network 110, which is connected to the hardware assembly line computer system 116. In other embodiments, the hardware list is communicated in another manner, perhaps manually. Hardware assembly begins with step 216 in which hardware assembly is controlled as computer system hardware components specified by the hardware list are retrieved from stock and the order of component assembly is planned. In step 218, the computer hardware components are assembled on hardware assembly line 114. In step 220, the assembled computer system is tested for assembly errors and hardware problems can be efficiently discovered when operating software is not available. If hardware problems arise, step 220 includes a process of replacing malfunctioning components. Following hardware checkout and correction, the assembled computer system 126 is connected to the network 110 and logs information relating to the hardware build operation to the manufacturing archive 130 over the network 110.

Software assembly begins with step 222 in which software assembly is controlled by the recording computer system 120 as computer system software components specified by the software list are retrieved from stock and the order of component assembly is planned. Also in software build step 222, the recording computer system retrieves selected software files from software component storage 124 over the network 110. The CD-ROM is written to contain any combination of manufacturer-specified software routines including BIOS files, operating systems, drivers, utilities, application software and vendor software. In CD-ROM burn step 224, the recording computer system 120 writes the retrieved software files to a CD-ROM using the CD-ROM writer 122. In step 226, the programmed CD-ROM is physically stored for a short period while the hardware components are assembled. When assembled computer system hardware 126 is ready, in step 228, the programmed CD-ROM is retrieved. The manufacturing process can be timed so that the CD-ROM is written shortly before hardware assembly is complete so that the CD-ROM storage and retrieval steps 226 and 228, respectively, are eliminated.

In step 230, computer system hardware and software are integrated as the assembled computer system 126 is bootstrapped and loaded from the retrieved CD-ROM. Diagnostic tests and system checkout operations are performed on the integrated hardware and software of the assembled computer system 126. The assembled computer system 126 is connected to the network 110 and logs information relating to the hardware-software integration and diagnostic testing to the manufacturing archive 130 over the network 110. A report is generated from the information in the manufacturing archive 130 containing, for example, a designation of success or failure of the load process, log information, diagnostic test data and system configuration data. This report is communicated to the assembled computer system 126 over the network 110 and stored in computer system memory. In the event of a network failure, bootstrap process software requests loading of a floppy disk and, upon loading of the disk, writes selected information relating to bootstrap and loading conditions of the computer system 126 at the time of the failure. This information is used for later processing when the network 110 operation is restored, allowing manufacturing to proceed despite a network failure.

In step 232, the CD-ROM is ejected from the assembled computer system 126 and the computer system 126, along with the CD-ROM and documentation are packaged for shipping. The documentation includes information stored in the manufacturing archive 130. The packaged computer system 226, documentation and CD-ROM are shipped to the customer in step 234.

The manufacturing archive 130 maintains information regarding every computer system which is manufactured.

Accordingly, the software configuration is readily restored if the original CD-ROM is lost or destroyed.

Figure 3:
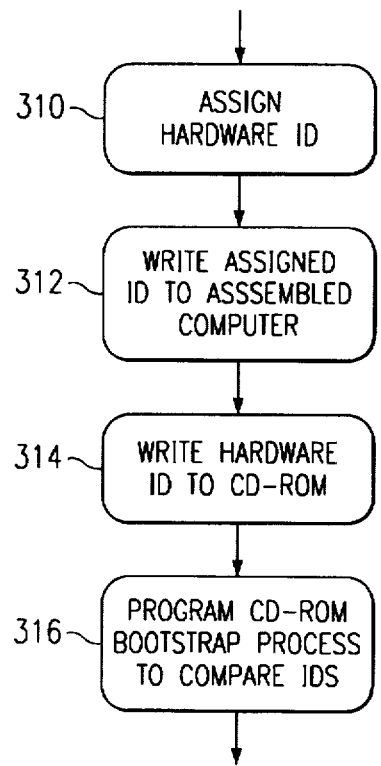
FIG. 3 is a flow chart which illustrates a method of configuring a selected group of software components for usage on a single computer system hardware.

Referring to FIG. 3, a flow chart illustrates a method of configuring a selected group of software components for usage on a single computer system hardware. This method is typically performed in conjunction with the method of manufacturing a computer system described with respect to FIG. 2. A first step 310 in the software configuration method is to assign an identification number to the assembled hardware components. Typically this identification number is, for example, a serial number assigned to the processor of the computer system. Step 310 is typically performed in conjunction with the hardware assembly control step 216 shown in FIG. 2. This identification number is written to the assembled computer system 126 in step 312, for example, a subroutine of step 220 when the assembled computer system is tested for assembly errors and hardware problems. In step 314, the identification number is written to the CD-ROM in CD-ROM burn step 224 of the manufacturing method. In some embodiments, the identification number is accessed over the network 110 by an information transfer from the hardware assembly line computer system 116 to the recording computer system 120. In step 316 a CD-ROM bootstrap process compares the identification number written to the CD-ROM with the identification number stored in the assembled hardware components and to complete the bootstrap operation only if the identification numbers match. The CD-ROM bootstrap process software typically resides on a floppy disk inserted into the assembled computer system 126. However for a computer system 126 having a capability to boot directly from a CD-ROM, the boot process software can be written to reside on the CD-ROM. Step 316 is a subroutine of step 218 of the manufacturing process when the computer hardware components are assembled on hardware assembly line 114. Accordingly, during step 230 of the manufacturing method, the identification numbers of the CD-ROM and computer system hardware are mutually verified as the assembled computer system 126 is bootstrapped and loaded from the retrieved CD-ROM. The identification number for the hardware system is retrieved from internal storage and compared to the identification number written onto the CD-ROM. If the identification numbers match, the bootstrap and load procedure continues. If the identification numbers do not match, an error is flagged for examination by a manufacturing employee. In this manner, it is assured that the customer receives the exact software configuration as specified on the software build list.

In a manufacturing system in which the identification number of the hardware system can be established in advance, hardware identification step 312 and software identification step 314, may proceed simultaneously, in parallel. In contrast, for a manufacturing system in which the identification number cannot be assigned in advance, CD-ROM production is delayed until the identification number of the hardware system is known. Computer systems that do not have a unique internal identifier cannot guarantee that an incorrect CD-ROM will not be loaded. However, the same principle may be employed in additional embodiments that associate a hardware identifier with more than a single computer system. For example, specific computer system models or computer systems produced by a particular manufacturer may be assigned a semi-unique hardware identifier so that a CD-ROM is associated with a group of computers.

The description of certain embodiments of this invention is intended to be illustrative and not limiting. Numerous other embodiments will be apparent to those skilled in the art, all of which are included within the broad scope of this invention.

What is claimed is:

1. A method of configuring software of a computer system comprising the steps of:

receiving a customer order for computer system, the customer order including a list of hardware configuration components and a list of software configuration components;

assembling hardware components designated by the list of hardware configuration components;

recording software components designated by the list of software configuration components on a CD-ROM, the CD-ROM providing the customer the capability to exactly restore the ordered software configuration components; and loading software components from the CD-ROM onto the assembled hardware components to ensure that the computer system includes the ordered software configuration components.

2. A method according to claim 1 further comprising the step of:

shipping the assembled hardware components and loaded software components and the CD-ROM to the customer.

3. A method according to claim 1 further comprising the step of:

retaining the list of software configuration components for subsequent replacement of the CD-ROM.

4. A method according to claim 1 wherein the software components are selected from a group including:

BIOS files, operating systems, drivers, utilities, application software and vendor software.

5. A method according to claim 1 further comprising the steps of:

assigning an identification number to the assembled hardware components;

storing the identification number in the assembled hardware components;

writing the identification number to the CD-ROM;

programming a CD-ROM bootstrap process to compare the identification number written to the CD-ROM with the identification number stored in the assembled hardware components and to complete the bootstrap operation only if the identification numbers match.

6. A method according to claim 1 wherein the hardware components assembling step and the software components recording step are performed in parallel.

7. A method according to claim 1 further comprising the steps of:

verifying that the list of software configuration components is compatible with the list of hardware configuration components; and terminating the software-configuring method if the software list and hardware list are incompatible.

* * * * *

UNITED STATES PATENT AND TRADEMARK OFFICE
CERTIFICATE OF CORRECTION

| | |
|---|---|
| PATENT NO. | : 5,894,571 |
| DATED | : April 13, 1999 |
| INVENTOR(S) | : Clint H. O'Connor |

It is certified that error appears in the above-identified patent and that said Letters Patent is hereby corrected as shown below:

<u>Column 4,</u>
Line 59, after "step", delete "224" and insert -- 214 --.

Signed and Sealed this

Nineteenth Day of March, 2002

Attest:

Attesting Officer

JAMES E. ROGAN
*Director of the United States Patent and Trademark Office*